United States Patent Office 3,632,749
Patented Jan. 4, 1972

3,632,749
TRIENINE AND A PROCESS FOR MAKING
THE SAME
Adorjan Aszalos, Kendall Park, Robert S. Robison, North
Brunswick, Felix Pansy, Jamesburg, and Bernard Berk,
Westfield, N.J., assignors to E. R. Squibb & Sons, Inc.,
New York, N.Y.
Filed Apr. 29, 1968, Ser. No. 724,818
Int. Cl. A61k 21/00
U.S. Cl. 424—118                    2 Claims

ABSTRACT OF THE DISCLOSURE

An antibiotic selected from the group consisting of trienine and salts thereof, said trienine being an amorphous, light-yellow material having the following average elemental analysis: C, 54.75; H, 7.99; N, 1.17; a minimum molecular weight of about 1400; a melting point in the range of 163–165° C.; a decomposition point of 180° C.; which is soluble in methanol, pyridine, and dimethylformamide; and which possesses an infrared absorption spectrum and an ultraviolet absorption spectrum as shown in FIGS. 1 and 2, respectively. Trienine is useful as an antifungal and antimicrobial agent.

---

Figure 1:
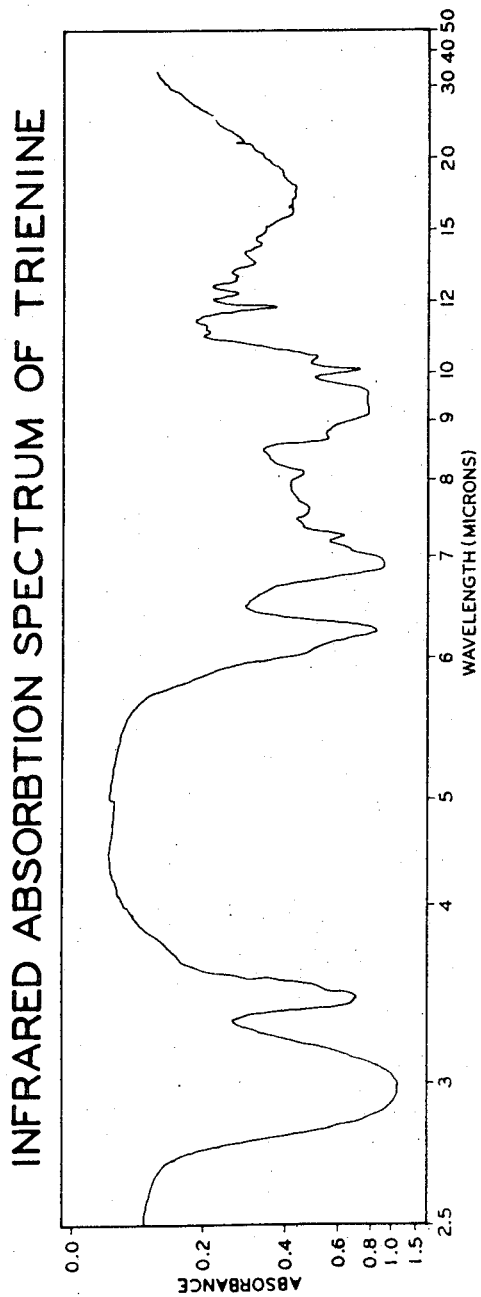

This invention relates to a new and useful antibiotic and more particularly to the new antibiotic, trienine, in its various forms.

Trienine is formed by cultivation, under controlled conditions, of a hitherto undiscovered microorganism which is a species of the genus Streptomyces. This Streptomyces species was obtained from a soil sample collected in Piscataway, N.J., and samples of a living organism have been deposited without restriction in, and made a part of, the American Type Culture Collection, Washington, D.C., and the culture collection of the Northern Utilization Research Branch of the Department of Agriculture, Peoria, Ill., from whence it is available under accession No. ATCC 21229, and NRRL 3424, respectively.

MICROORGANISM

Streptomyces sp. ATCC 21229 develops abundantly in culture media usually employed for cultivation of other organisms of the same genus. It is capable of growing at temperatures in the range of about 20° C. to 30° C., preferably at a temperature of 25° C., on an agar slant medium which is prepared by admixing 20 g. of tomato paste, 20 g. of oatmeal, and 500 ml. of boiling water, cooling this mixture to a thin gruel, filtering, adding the filtrate to 15 g. of agar in 500 ml. of water, and sterilizing the resultant mixture at 121° C. and 15 lbs. steam pressure for 20 minutes. On this media the aerial mycelium is gray colored and a light-brown soluble pigment is produced.

It is to be understood that the invention is not limited to the use of the particular organism herein described, but includes inter alia variations and mutants obtained by treatment of the microorganism with, for instance, ultraviolet rays, X-rays, manganese chloride, camphor, nitrogen mustards, and the like, as well as polyploids of the various mutants.

FERMENTATION

The environment and nutritional requirements for the fermentation of Streptomyces sp. ATCC 21229 are similar to those necessary for the production of antibiotics by other aerobic microorganisms. Thus, aerobiosis can be sustained in a liquid nutrient medium inoculated with a sterile culture incubated in flasks placed on shaking machines. For industrial production, metal tanks with internal aeration and agitation by means of paddles can be substituted. Trienine can also be produced by surface cultivation. The microorganism requires as nutrient elements, one or more sources of energy and carbon, organic nitrogenous substances and mineral salts. Cultivation is best effected when the initial pH of the culture medium is between 5.5 and 8.5, the optimum pH being around 7.0.

The utilizable sources of carbon for the production of the antibiotic are very diverse, there being included inter alia sugars (such as glucose, lactose, maltose, sucrose), dextrin, starches of different types of origin, glycerol (and other polyalcohols), inositol and animal and vegetable fats, as well as esters thereof. The sources of organic nitrogen which actively stimulate growth and favor production of trienine are substances such as soybean meal, cotton meal and other vegetable meals (whole or partially or totally defatted), meat flours or animal viscera, various peptones, casein hydrolysates, soybean hydrolysates, yeast hydrolysates, lactalbumin, wheat glutins, distillers solubles, corn steeps, urea and amino acids.

Mineral salts, such as the chlorides, nitrates, sulfates, carbonates and phosphates of sodium, ammonium and calcium, should be included in appropriate concentrations. The nutritive medium should contain traces of metals such as magnesium, iron, copper, manganese, zinc and cobalt.

For the adjustment of pH during the course of the fermentation, it is preferred to add buffering agents, such as calcium carbonate. If necessary, an antifoaming agent may be added to the fermentation medium.

Under the described conditions and with the temperature of cultivation at about 25° C., maximum production of trienine is obtained between 1 and 5 days in tanks.

The inoculum for the fermentation can be provided from suspensions of spores or of lyophilized mycelium, freeze-dried with an inert substrate. It is usually transferred through one or more passages in liquid media before the final fermentation.

ISOLATION OF TRIENINE

Trienine can be recovered in good yield from the crude or centrifuged fermentation broth at a pH between 5 and 8, where trienine exhibits its greatest stability. At a more acidic pH there is some loss, the rate of loss being accelerated with decreasing pH.

As the active product is initially obtained in an insoluble form finely dispersed in the fermentation medium, nearly all the activity is retained together with the mycelium upon filtering the fermentation broth at fermentation pH values, preferably with the help of a filter aid such as Hyflo. Trienine can be recovered from the resulting filter cake by extraction of the wet cake with a polar solvent such as isopropyl alcohol. The resulting extract is then concentrated and the concentrate resuspended in the solvent for several hours at about 5° C. The precipitate which forms is then filtered off and dried.

Further purification may be achieved by subjecting this product to a further extraction step, a counter current distribution step, preferably in a Craig apparatus, and several reprecipitation steps.

CHEMICAL AND PHYSICO-CHEMICAL PROPERTIES OF TRIENINE

Trienine is an amorphous light-yellow powder with M.P. 163–165 and decomposition point of 180° C. It is soluble in MeOH, pyridine, DMF, but insoluble in most other organic solvents.

Trienine gives a positive Tollens and a negative Fehling reaction. The ninhydrin reaction is positive only after acid hydrolysis. In the acid hydrolysate no amino acids could be detected by paper chromatographic methods. Elemental analysis gives the following values: C, 54.75; H, 7.99; N, 1.17; O, 36.09 (by difference). Based on the N value, the minimum molecular weight is about 1400.

Non-acqueous NE (neutralization equivalent) titrations indicate acid and base equivalents about the region for molecular weights suggested above. NE acid 1500, NE base 1580.

IR spectrum of trienine (FIG. 1) shows characteristic absorption at 3.0, 3.42, 6.26, 6.90, 7.25, 8.12, 8.70, 10.07 and 11.80 microns. Based on the IR spectrum, it is concluded that trienine contains ionized carboxyl groups and hydroxyl groups. Absorption at 10.07 is due to the triene formation. The characteristic absorption due to the lactone group in the polyenic antibiotics around 5.8 microns is not present. The IR spectrum and high molecular weight of trienine lead to the conclusion that it is not a typical polyenic antibiotic.

The ultraviolet spectrum of trienine in methanol (FIG. 2) shows a typical absorption curve for a triene. Absorptions are at 257, 267 and 278 mμ with

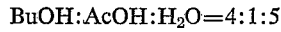

values of 332, 407 and 322, respectively. The ε mole calculated from the peak 267 with molecular weight 1400 is 56,980, which is very close to the value of 53,000 given for octatriene in the literature. Thus, the minimum molecular weight calculated from the UV data is in agreement with that calculated from the elemental analysis.

Ultracentrifugal measurements were done according to J. Kirschbaum and A. Aszalos [J. Pharm. Sci., 56, 410–411 (1967)] using Archibald approach to sedimentation equilibrium optics at 42,000 r.p.m. and 75° schlieren phase bar angle at 20° C. In phosphate buffer, two components were found with molecular weight 1300 and 3200. In MeOH only one component was found with molecular weight of 1430. The second component with molecular weight 3200 in phosphate buffer is believed to be present due to dimer formation. The ultracentrifugal measurements thus support the calculated molecular weight from elemental analysis and from the UV data.

Several chromatographic systems were used during the isolation process of trienine to ascertain homogeneity. On paper (Whatman No. 1) in solvent system $$BuOH:AcOH:H_2O = 4:1:5$$

trienine has an $R_f$ of 0.55. On Eastman chromagram ITLC with solvent MeOH, trienine has an $R_f$ of 0.0.

Trienine forms salts by reaction with bases in known manner. As examples of such salts may be mentioned metal salts such as sodium, potassium, calcium, and the like, the ammonium salts and amine salts, e.g., the procaine salt.

ANTIMICROBIAL PROPERTIES

Trienine shows the following in vitro spectrum:

Table I

| Microorganism: | M.I.C. (mcg./ml.) |
|---|---|
| S. aureus | 0.37 |
| S. pyogenes | 0.44 |
| E. coli | >50 |
| P. vulgaris | >50 |
| P. aeruginosa | >50 |
| S. schottmuelleri | >50 |
| Geotrichum candidum | 9.4 |
| S. cerevisiae | 7.8 |
| C. tropicalis | 6.3 |
| C. krusei | 9.4 |
| C. albicans | 8.6 (14.0) |
| T. mentagrophytes | ≥50 |
| F. bulbigenum | 6.3 |
| A. niger | 6.3 |

Thus, trienine is useful as an antibacterial and antifungal agent against microorganisms such as those set forth above.

As such, it is of use as a preservative (for example, in leather, paper and paints) and especially in plastics and fabrics to render them proof against mildew or other fungus attack. In the protection of fabrics, for example, the fabric may be impregnated with trienine or a salt thereof as by soaking or spraying. Trienine can also be used as a plant protective agent, for which purpose it can be sprayed on the plants to be treated. A suitable spray can be prepared by wet ball-milling trienine or a salt thereof with water and preferably a wetting agent, such as polyoxyalkylene sorbitan higher fatty acid (e.g., Tween 20, a polyoxyethylene sorbitan monolaurate).

Trienine may also be employed as a surface disinfectant. For this purpose it is dissolved, preferably also containing a detergent or other cleansing agent, at a concentration of about 0.1 to about 10.0%, preferably about 0.5 to about 1.0% by weight. Such solutions may then be employed as washes to disinfect floors, walls, tables, and the like, as well as in the cleaning of dairy or food processing equipment.

The following example illustrates the preparation and isolation of trienine:

Example

The microorganism Streptomyces sp. ATCC No. 21229 was isolated from a soil sample obtained from Piscataway, New Jersey, by conventional plating techniques. It is maintained on an agar slant medium made from 20 g. of tomato paste, 20 g. of oatmeal, 500 ml. of boiling water, which are cooled to a thin gruel, filtered, then added to 15 g. of agar in 500 ml. of water and sterilized at 121° C. and 15 pounds steam pressure for 20 minutes. On this medium, the aerial mycelium is gray colored and a light-brown soluble pigment is produced.

A portion of the growth from well sporulated slant suspended in 0.01% Dupanol solution is used to inoculae 50 ml. of serilized broth in a 250 ml. flask. The broth has the following composition (on a wt. basis):

| | Percent |
|---|---|
| Soybean meal | 1.5 |
| Glucose | 5.5 |
| $CaCO_3$ | 0.7 |
| $KH_2PO_4$ | 0.1 |
| $(NH_4)_2SO_4$ | 0.5 |
| $K_2HPO_4$ | 0.1 |
| Corn steep liquor | 0.25 |
| Distilled water—1000 ml. | |

Autoclave at 121° C. and 15 pounds steam pressure for 30 minutes.

After 48 hours incubation at 25° C. on a rotary shaker, the contents of the flask are transferred to 1000 ml. of the above sterile medium in a 4000 ml. flask. After 48 hours incubation on a rotary shaker at 25° C., the entire contents of the flask are used to inoculate a 200 gallon germinator tank containing 225 liters of the above medium with a 0.01% defoamer (UCON lubricant).

Growth is continued for an additional 48 hours at 25° C. with an air rate of 1.0 ft./min., superficial air velocity and agitation equivalent to 0.2 HP/100 gallons. At this time, approximately 55 liters of the germinator inoculum is used to inoculate 500 liters of the same medium used in the germinator stage and contained in a 250 gallon fermentor.

The fermentation is continued for 120 hours at 25° C. The air rate is 1.0 ft./min., superficial air velocity and agitation equivalent to 0.2 HP/100 gallons is used.

After 120 hours of fermentation, the whole broth is filtered on a filter press with the help of filter aid (Hyflo). Since the majority of the antibiotic is in the filter cake, the filtered broth is discarded. The filter cake is extracted twice with 2 liters isopropyl alcohol per kilogram of filter cake and the combined extract is concentrated to 1/60–1/70 of its volume in vacuo. To this concentrate, which is a watery suspension, is added three volumes of isopropyl alcohol and the suspension is kept 4–6 hours at 5° C. The formed precipitate is filtered off and dried at 30° C. in vacuo.

Ten grams of this precipitate is suspended in 1 liter upper and 1 liter lower phases of BuOH—$H_2O$ pH adjusted to 2.5 (dil. HCl). After 30 minutes stirring, both phases are filtered and the filtrate is placed in a separatory funnel. The lower phase is removed and the upper phase is shaken with 1 liter lower phase of the above described solvent system. The lower phase is removed again and this extraction process is repeated three more times. The pH is kept 2.5 throughout the entire process. After removal of the last lower phase, the remaining upper phase is neutralized (dil. NaOH solution) and is taken to dryness. Yield is about 2 grams at this point. This 2 grams of material is dissolved in 125 ml. upper and 125 ml. lower phases of BuOH:$H_2O$ at pH 10 (dil. NaOH). The phases are put in a separatory funnel and a five-step Craig distribution process is carried out at room temperature within the period of 6–8 hours. The pH is kept at 10 during this process in each tube. At the end of the Craig process the contents of all 6 tubes are neutralized (dil. HCl) and taken to dryness. Each fraction is then assayed by the following method.

Each fraction is assayed to determine its activity against *S. aureus* and its ultraviolet absorption spectrum. The presence of trienine is shown by an M.I.C. (in mcg./ml.) for *S. aureus* of about 1.2 to 1.5 and ultraviolet absorptions at 257, 267, 278 m$\mu$ with an $E_1^1$ value of about 70 to 100 at 267 m$\mu$.

Two grams of the fraction or fractions containing trienine is extracted twice with 60 ml. of pyridine:water= 5:1 in a centrifuge. The supernatant is concentrated to about 10 ml. Any formed insolubles during the concentration are centrifuged off and to the clear concentrated supernatant four volumes of isopropyl alcohol is added. The formed precipitate is washed in the centrifuge tube with isopropyl alcohol and is dried at 35° C. in vacuo. The mother liquor is discarded. The above process is repeated with the solids until no change in the UV mole extinction coefficient can be observed. Usually two or three such precipitations are enough. The yield in this precipitation process is about 15–20%. The product is an amorphous light-yellow material.

The invention may be variously otherwise embodied within the scope of the appended claims.

Figure 2:
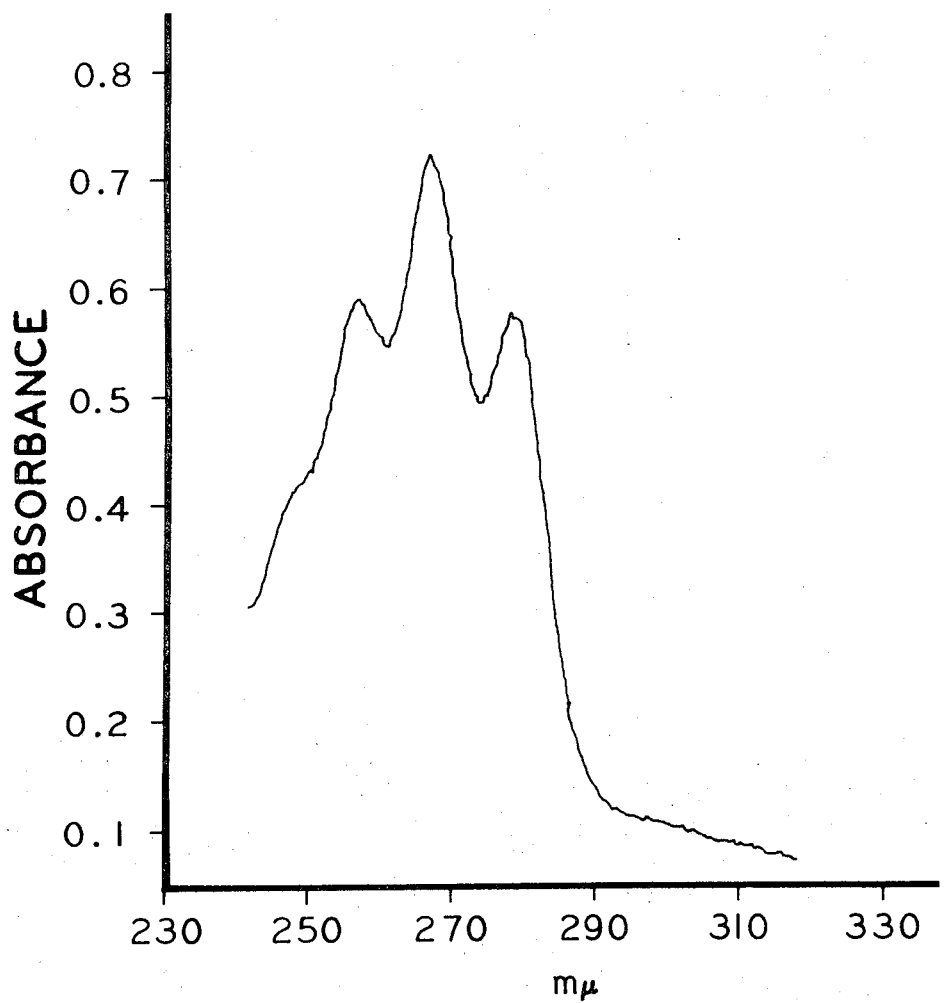

What is claimed is:

1. An antibiotic selected from the group consisting of trienine and salts thereof, said trienine being an amorphous, light-yellow material having the following average elemental analysis: C, 54.75; H, 7.99; N, 1.17; a minimum molecular weight of about 1400; a melting point in the range of 163–165° C.; a decomposition point of 180° C.; which is soluble in methanol, pyridine, and dimethylformamide; and which possesses an infrared absorption spectrum and an ultraviolet absorption spectrum as shown in FIGS. 1 and 2, respectively.

2. A process for producing the antibiotic of claim 1, which comprises culturing Streptomyces species ATCC 21229 under aerobic conditions in an aqueous nutrient medium comprising an assimilable, fermentable carbohydrate and assimilable nitrogen source until a substantial amount of the antiboitic is accumulated, and recovering trienine from the medium.

No references cited.

ALBERT T. MEYERS, Primary Examiner

J. D. GOLDBERG, Assistant Examiner